Patented Sept. 18, 1923.

1,468,029

UNITED STATES PATENT OFFICE.

CHARLES NOLL, OF CLEVELAND, OHIO.

PLASTIC COMPOSITION.

No Drawing.   Application filed November 21, 1921.   Serial No. 516,685.

*To all whom it may concern:*

Be it known that I, CHARLES NOLL, a citizen of the United States, residing at Cleveland, in the county of Cuyahoga and State of Ohio, have invented a certain new and useful Improvement in Plastic Compositions, of which the following is a full, clear, and exact description.

This invention relates to compositions such as are employed for the purpose of plastering walls or similar supports or foundations, the invention being an addition to, or an improvement upon, the composition covered by my Patent No. 1,239,032, issued September 4, 1917.

It is the general purpose of the invention to provide a composition which, when mixed in the usual manner with water or other liquid, will adhere firmly to the surface to which it may be applied; which may be employed either as an outside or an inside wall coating; which, when so applied, will be substantially impervious to moisture; which will not crack or chip; which will not abrade; which is capable of receiving a coat of paint without absorbing the same; which is adapted for either a smooth (or trowel) finish, or a rough (or sand) finish; which is particularly easy to work; which will set very quickly and completely, alike in a dry or a moist atmosphere; and which will not deteriorate after having been mixed with liquid.

In preparing my composition, I mix together dry, pulverized slaked lime, yellow clay, dry screened silica sand, rye flour, and white "Medusa" cement, in about the following proportions by weight:

| | Parts. |
|---|---|
| Slaked lime | 6½ |
| Yellow clay | 15 |
| Silica sand | 73 |
| Rye flour | 5 |
| Cement | 5 |

The "Medusa" cement referred to is nearly white "Portland" cement made from white limestone and substantially free from iron.

The above mixture, being dry and free from lumps, may be shipped in bags or other containers and requires only the addition thereto of sufficient water (or other liquid) to produce a plaster of the desired plasticity.

As explained in my aforesaid patent, the silica sand (containing about 98% silica) cooperates with the other ingredients to prevent chipping. The rye flour acts, not only as a binder with the clay and other ingredients to counteract the tendency of the plaster to rub or flake off when dry, but cooperates with the clay to impart the desired plasticity to the compound when mixed with the liquid employed therewith as well as to prevent burning with the lime constituent.

While the plaster produced in accordance with my aforesaid patent possesses the advantages therein set forth over other and prior plasters with which I am acquainted, the changes in the proportions of the silica sand, slaked lime and clay, and the addition of the Medusa cement, results in the following advantages:—

(*a*) It greatly increases the quickness and completeness of the setting, thus effecting a great saving in the time required for applying and finishing the plaster.

(*b*) The hardness of the composition, when set, is materially increased; and the tendency of the plaster, when dry, to rub or flake off, is reduced to a minimum.

(*c*) The bonding efficiency of the composition is enhanced.

(*d*) The composition will set quickly and completely in a damp atmosphere.

(*e*) The composition can be used in cold weather without injury by freezing.

In common with the composition of my aforesaid patent, this composition may be applied directly to concrete surfaces, and is especially useful where a particularly hard surface is required. Furthermore, it can be used either as a bonding coating or a finishing coating, and no special care is required in connection with its application.

As is the case with the composition of my patent aforesaid, there will be no deterioration of the mortar produced from my composition should the liquid dry out, and it may be used by adding thereto sufficient liquid to bring it to the desired plastic condition. With the present composition however, the retempering should take place within 10–12 hours from the first mixing in order to preserve the properties of the cement. If retempering occurs after this time, the cement will be inactive and function only as sand or an inactive ingredient.

While the plaster produced by mixing my composition with water is capable of resisting the water more efficiently than any other plaster or stucco with which I am acquainted, I prefer, when using my composition for such outside or stucco work, to mix the same with any suitable moisture-excluding liquid such as linseed oil. This will render the composition completely weather-resistant, and it will not crack, chip, burn or rub off. Furthermore, because of the hardness and nonabsorbent character of the plaster produced by my compound, I can apply directly thereto a coating of paint, without the necessity for first sizing or otherwise specially treating the same.

In plastering certain surfaces, the compound of my aforesaid patent may be used as a base coat, employing the compound set forth herein as a finishing coat.

Having thus described my invention, what I claim is:

1. A composition for making plaster containing slaked lime, clay, silica sand, flour, and cement.

2. A composition for making plaster containing slaked lime, clay, silica sand, flour and Portland cement substantially free from iron.

3. A composition for making plaster containing slaked lime, clay, silica sand, flour, and Portland cement, substantially free from iron, in about the proportions specified.

4. A composition for making plaster containing slaked lime, clay, silica sand, flour, and a cement capable of increasing the hardness and the quickness of setting of the plaster produced therefrom.

5. A composition for making plaster containing the following ingredients in substantially the following proportions by weight:—

| | Parts. |
|---|---|
| Dry slaked lime | 6½ |
| Dry yellow clay | 15 |
| Dry silica sand | 73 |
| Dry rye flour | 5 |
| Dry Portland cement | 5 |

6. A plaster containing slaked lime, yellow clay, silica sand, flour, and Portland cement, mingled in about the proportions specified and rendered plastic by admixture with liquid.

7. A plaster containing slaked lime, yellow clay, silica sand, rye flour, and Portland cement substantially free from iron, the aforesaid ingredients being rendered plastic by admixture with liquid.

8. A plaster containing slaked lime, yellow clay, silica sand, rye flour, and Portland cement, in substantially the proportions specified, mingled with a moisture-excluding liquid.

9. A plaster containing slaked lime, yellow clay, silica sand, rye flour, and Portland cement, mingled with a moisture-excluding liquid.

10. A plaster containing slaked lime, yellow clay, silica sand, rye flour, and Portland cement substantially free from iron, the ingredients being mingled in substantially the proportions set forth and rendered plastic by admixture with water.

In testimony whereof, I hereunto affix my signature.

CHARLES NOLL.